US009393860B2

(12) United States Patent
Vidal et al.

(10) Patent No.: US 9,393,860 B2
(45) Date of Patent: Jul. 19, 2016

(54) WHEEL SUPPORT PROVIDED WITH PIPES FOR SUPPLYING A HYDRAULIC DEVICE

(71) Applicant: POCLAIN HYDRAULICS INDUSTRIE, Verberie (FR)

(72) Inventors: Stephane Vidal, Verberie (FR); Bertrand Bonnomet, Verberie (FR); Jeremie Mulot, Verberie (FR); Laurent Albert, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 0 days.

(21) Appl. No.: 14/367,222

(22) PCT Filed: Dec. 20, 2012

(86) PCT No.: PCT/EP2012/076322
§ 371 (c)(1),
(2) Date: Jun. 19, 2014

(87) PCT Pub. No.: WO2013/092825
PCT Pub. Date: Jun. 27, 2013

(65) Prior Publication Data
US 2015/0000993 A1    Jan. 1, 2015

(30) Foreign Application Priority Data

Dec. 21, 2011  (FR) ..................... 11 62206
Apr. 6, 2012   (FR) ..................... 12 01051

(51) Int. Cl.
*B60K 7/00* (2006.01)
*B60K 17/14* (2006.01)
(Continued)

(52) U.S. Cl.
CPC .............. *B60K 7/0015* (2013.01); *B60K 17/14* (2013.01); *B62D 7/18* (2013.01); *F16L 27/087* (2013.01);
(Continued)

(58) Field of Classification Search
CPC ...... B60K 7/0015; B60K 17/14; B60K 17/30; B60K 2007/0038; B60K 2007/0092; B62D 7/18; F16L 27/087; F16L 39/04
USPC .......................... 180/252, 253, 305, 307, 308; 280/93.512
See application file for complete search history.

(56) References Cited

U.S. PATENT DOCUMENTS 3,225,855 A * 12/1965 Sherwen ................. 180/253
5,529,347 A *  6/1996 Lee ....................... 285/121.3
(Continued)

FOREIGN PATENT DOCUMENTS

| DE | 1455 695 A1 | 4/1969 |
| FR | 2 688 175 A3 | 9/1993 |
| FR | 2 693 157 A1 | 1/1994 |
| GB | 512744 A * | 7/1939 |

*Primary Examiner* — Jacob Knutson
(74) *Attorney, Agent, or Firm* — Blakely, Sokoloff, Taylor & Zafman LLP

(57) ABSTRACT

The present invention relates to an assembly comprising —an axle (1), —a steering pivot (2) mounted on the axle (1), —a wheel spindle (3) mounted on the pivot (2), —a hydraulic motor and a wheel mounted on said spindle (3), such that the spindle (3) is pivotally mounted relative to the axle (1), the axle (1), the spindle (3) and the pivot (2) being provided with communicating hydraulic pipes to supply the hydraulic motor with fluid, the hydraulic pipes being arranged in the axle (1), the pivot (2) and the spindle, the pivot (2) comprising a shaft member fitted in the axle (1) about which the spindle (3) is fitted, the axle (1) and the spindle (3) each comprising grooves connected respectively to the hydraulic pipes of the axle (1) and the spindle (3) in such a way as to form the rotating joint with the hydraulic pipes of the pivot (2).

21 Claims, 14 Drawing Sheets

(51) Int. Cl.
 *B62D 7/18* (2006.01)
 *F16L 27/087* (2006.01)
 *F16L 39/04* (2006.01)
 *B60K 17/30* (2006.01)

(52) U.S. Cl.
 CPC ............... *F16L 39/04* (2013.01); *B60K 17/30* (2013.01); *B60K 2007/0038* (2013.01); *B60K 2007/0092* (2013.01)

(56) References Cited

U.S. PATENT DOCUMENTS

| | | | |
|---|---|---|---|
| 6,302,233 B1 * | 10/2001 | Okamuro et al. | 180/253 |
| 7,530,583 B2 * | 5/2009 | Gottschalk | 280/93.512 |
| 2007/0187168 A1 * | 8/2007 | Phillips | 180/305 |
| 2009/0230649 A1 * | 9/2009 | Ziech | 280/93.512 |
| 2012/0217079 A1 * | 8/2012 | Besler et al. | 180/233 |

* cited by examiner

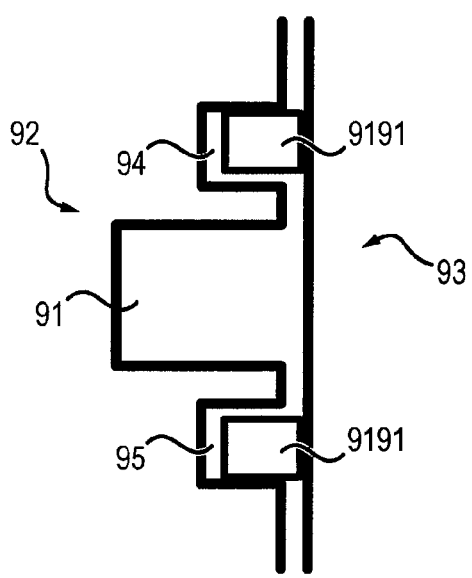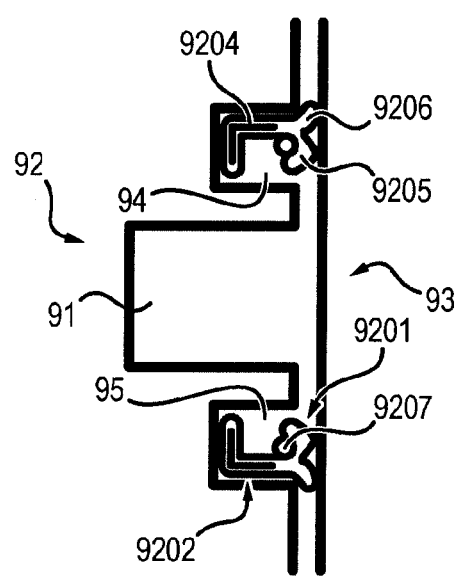

WHEEL SUPPORT PROVIDED WITH PIPES FOR SUPPLYING A HYDRAULIC DEVICE

GENERAL TECHNICAL FIELD

The present invention relates to the field of vehicles provided with hydraulic motors mounted on their wheels in order to ensure the driving thereof.

STATE OF THE ART

Vehicles and machines provided with hydraulic motors directly mounted on the wheel spindles in order to drive them individually are commonly used, for example for applications with significant loads or for highly variable conditions of use. The connection of such motors to a flow or pressure source; for example a hydraulic pump or accumulators, is delicate to make, in that it requires having pipes extending over a substantial length of the vehicle, and is all the more delicate when these are guide wheels.

In document FR 2693154 in the name of the applicant, a solution is known for making such connection, by making a rotating joint to which are directly connected the pipes of the hydraulic power supply of the motor.

However, this solution is restrictive to apply, notably as regards the connection of flexible pipes in proximity to the wheel and to the brake, and in terms of bulkiness.

PRESENTATION OF THE INVENTION

The present invention aims at proposing a system not having such drawbacks.

For this purpose, the invention proposes an assembly, comprising
  an axle,
  a steering pivot mounted on the axle,
  a wheel spindle mounted on the pivot,
  a hydraulic motor and a wheel mounted on said spindle,
  so that the spindle is pivotally mounted relatively to the axle; the axle, the spindle and the pivot being provided with communicating hydraulic pipes for supplying the hydraulic motor with fluid, the hydraulic pipes being laid out in the axle, the pivot and the spindle so that the pivot produces a rotating joint ensuring fluidic connection of said pipes laid out in the axle, the pivot and the spindle, during the pivoting of the spindle relatively to the axle,
  characterized in that the pivot comprises a shaft member fitted in the axle and in which are laid out said hydraulic pipes, the spindle being pivotally mounted on the shaft member, the axle and the spindle each comprising grooves extending around said shaft axis and respectively connected to the hydraulic pipes of the axle and of the spindle so as to thus produce the rotating joint with the hydraulic pipes of the pivot.

According to a particular embodiment, the pipes laid out in the axle correspond to a high pressure line and a low pressure line connected to the hydraulic motor, each axle and spindle, thus comprising two grooves for forming a fluidic connection between said pipes forming the high and low pressure lines of the axle, of the pivot and of the spindle.

The axle and the spindle then typically comprise additionally two leak grooves positioned on either side of said grooves, said leak grooves being connected to a drain line opening into a reservoir at ambient pressure and/or to a pressure line of the case of the hydraulic motor, and being adapted for collecting the leaks from the rotating joint.

According to another particular embodiment, said pipes are each seal grooves provided with high pressure or low pressure sealing members.

According to another particular embodiment, the pivot comprises a shaft member fitted in the axle and in which are laid out said hydraulic pipes, said shaft member comprising peripheral grooves connected to the pipes laid out in this shaft member, so that these grooves are in fluidic communication with the pipes laid out in the axle and in the spindle.

Said pivot is then typically provided with at least two mechanical bearing areas connecting it to the axle, each of said mechanical bearing areas being surrounded by sealing members comprising grooves made in said pivot or in said axle in which are positioned seal gaskets.

At least one of said bearing areas is then typically lubricated by means of hydraulic oil, said bearing area being connected by means of a leak line to a hydraulic pipe laid out in the axle, the spindle or the pivot so as to ensure supply of hydraulic oil to said bearing area.

According to a particular embodiment, said pipes laid out in the axle open from said axle onto surfaces comprising means for attaching flexible hoses in order to connect them to said pipes laid out in the axle.

According to a particular embodiment, said assembly further comprises a yoke attached on said wheel spindle and rotatably mounted around said pivot, said yoke comprising suitable pipes for allowing a fluidic connection between the pipes laid out in the pivot and in the spindle.

Said pivot is then typically provided with at least two mechanical bearing areas connecting it to the yoke, each of said mechanical bearing areas being surrounded by sealing members comprising grooves laid out in said pivot or in said yoke in which are positioned seal gaskets.

According to a particular embodiment, the pivot is fixedly mounted on the spindle so that the system formed by the pivot and the spindle is pivotally mounted relative to the axle.

The invention also relates to a vehicle comprising a steered wheel mounted on an assembly as defined earlier, as well as to means for supplying hydraulic motors with hydraulic fluid, the fluidic connection between said supply means and said rotors being achieved by means of pipes laid out in said axle, pivot and spindle.

PRESENTATION OF THE FIGURES

Other features, objects and advantages of the invention will become apparent from the description which follows, which is purely illustrative and non-limiting, and which should be read with reference to the appended drawings, wherein.

Figure 5:
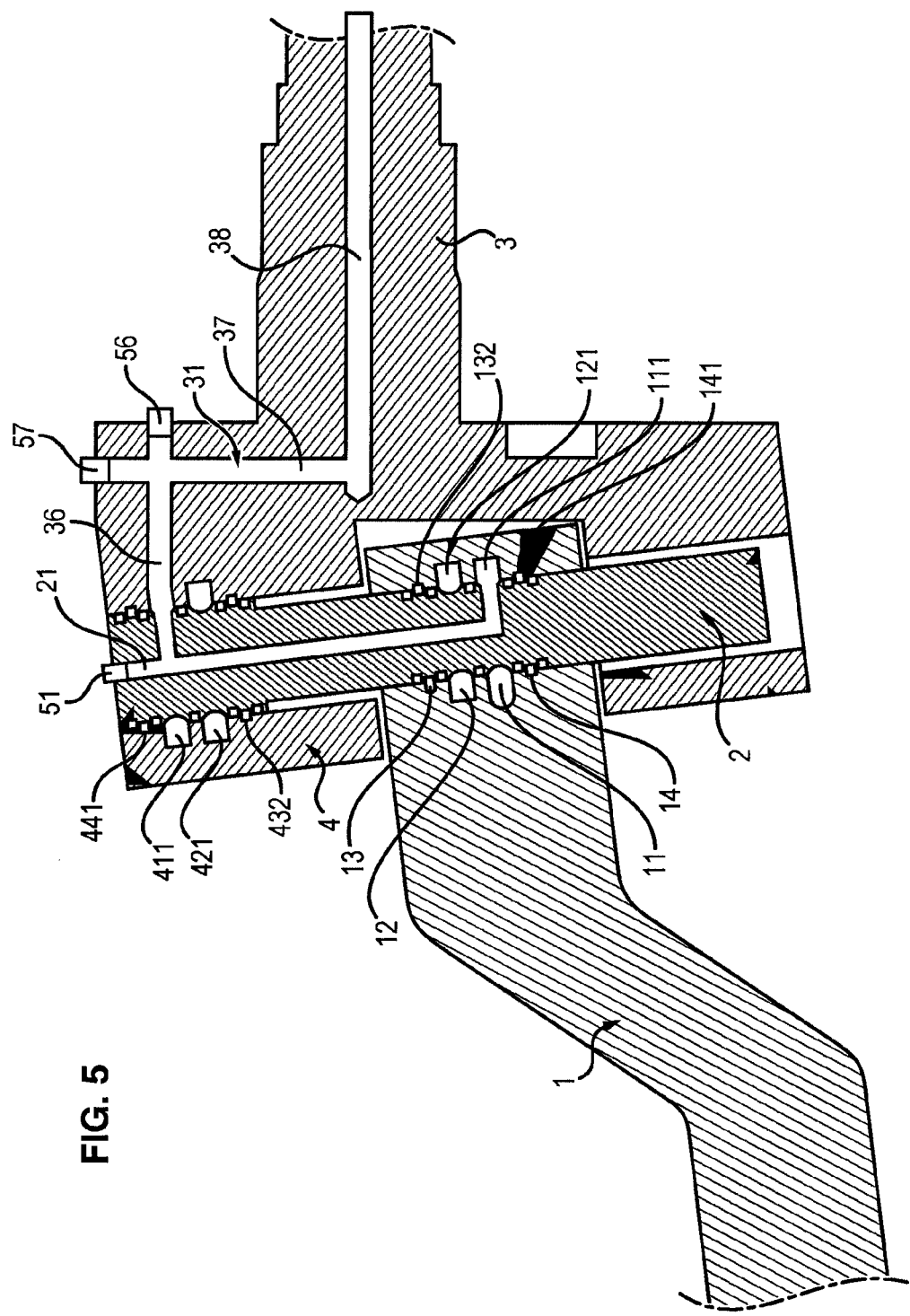
Figure 6:
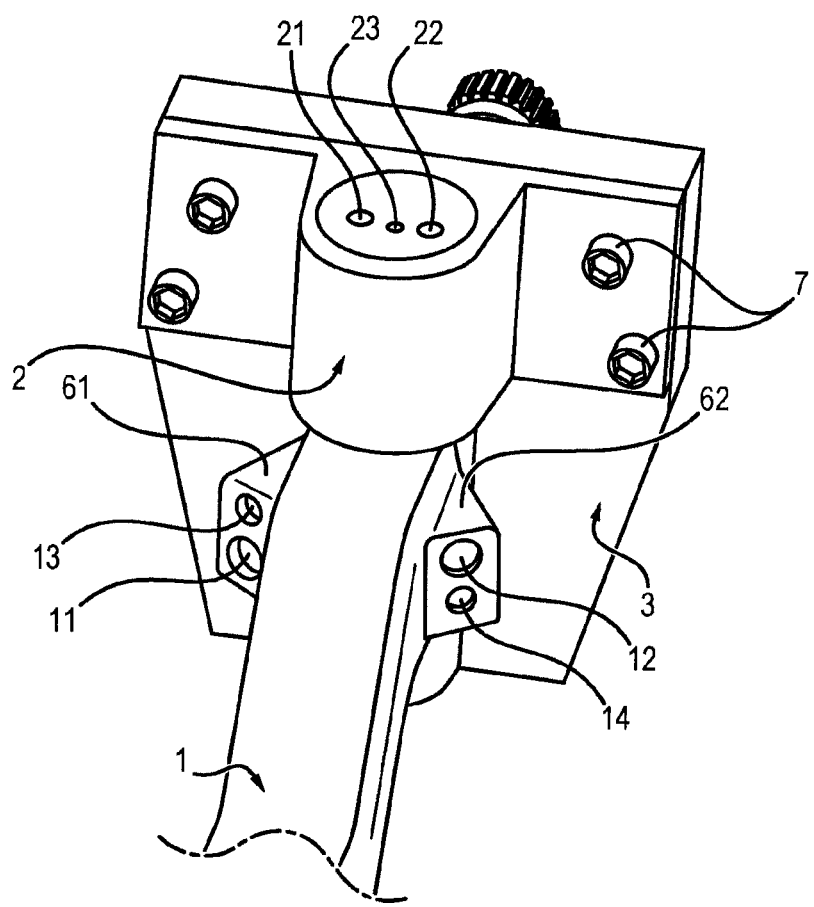
Figure 7:
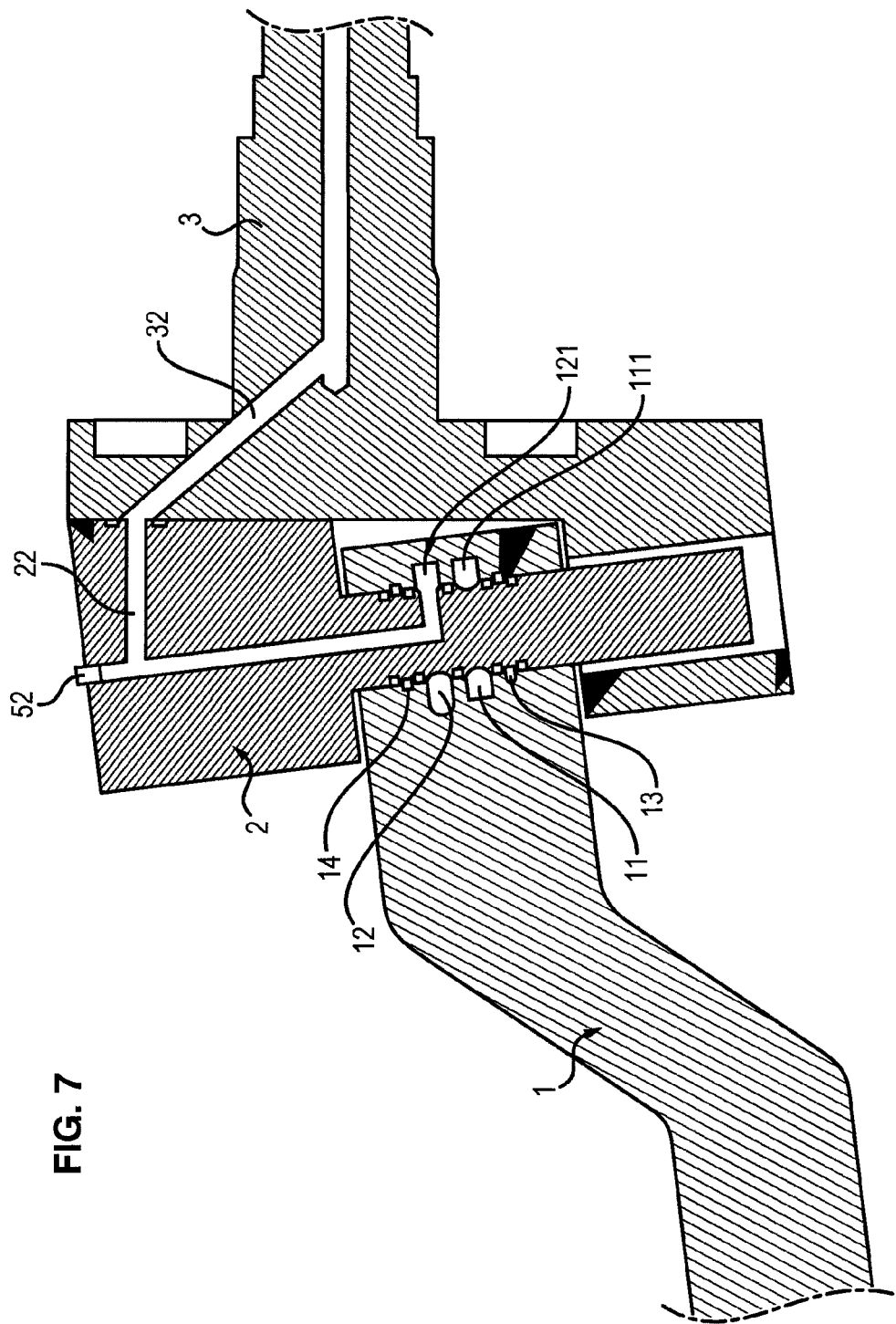
Figure 8:
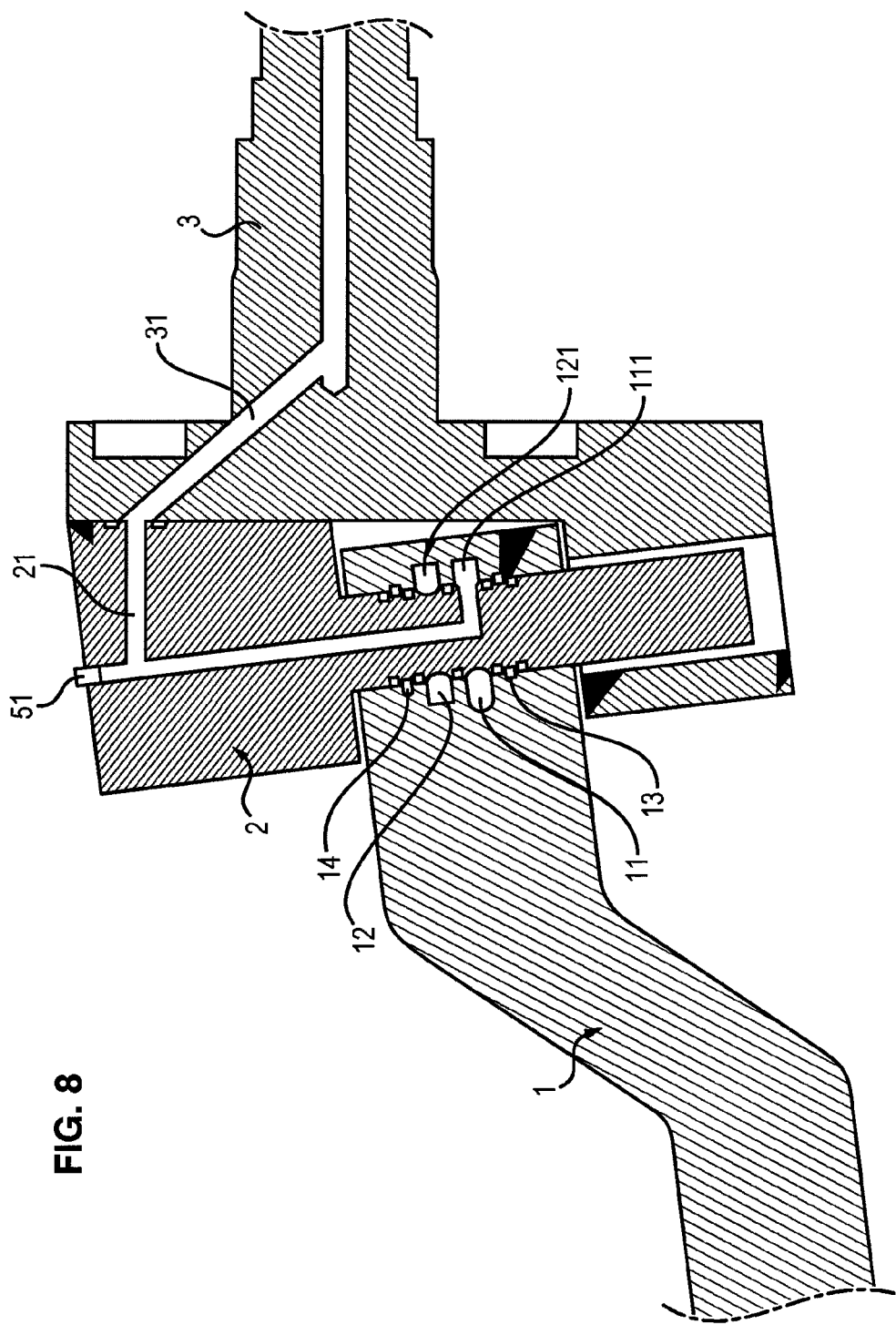
Figure 9:
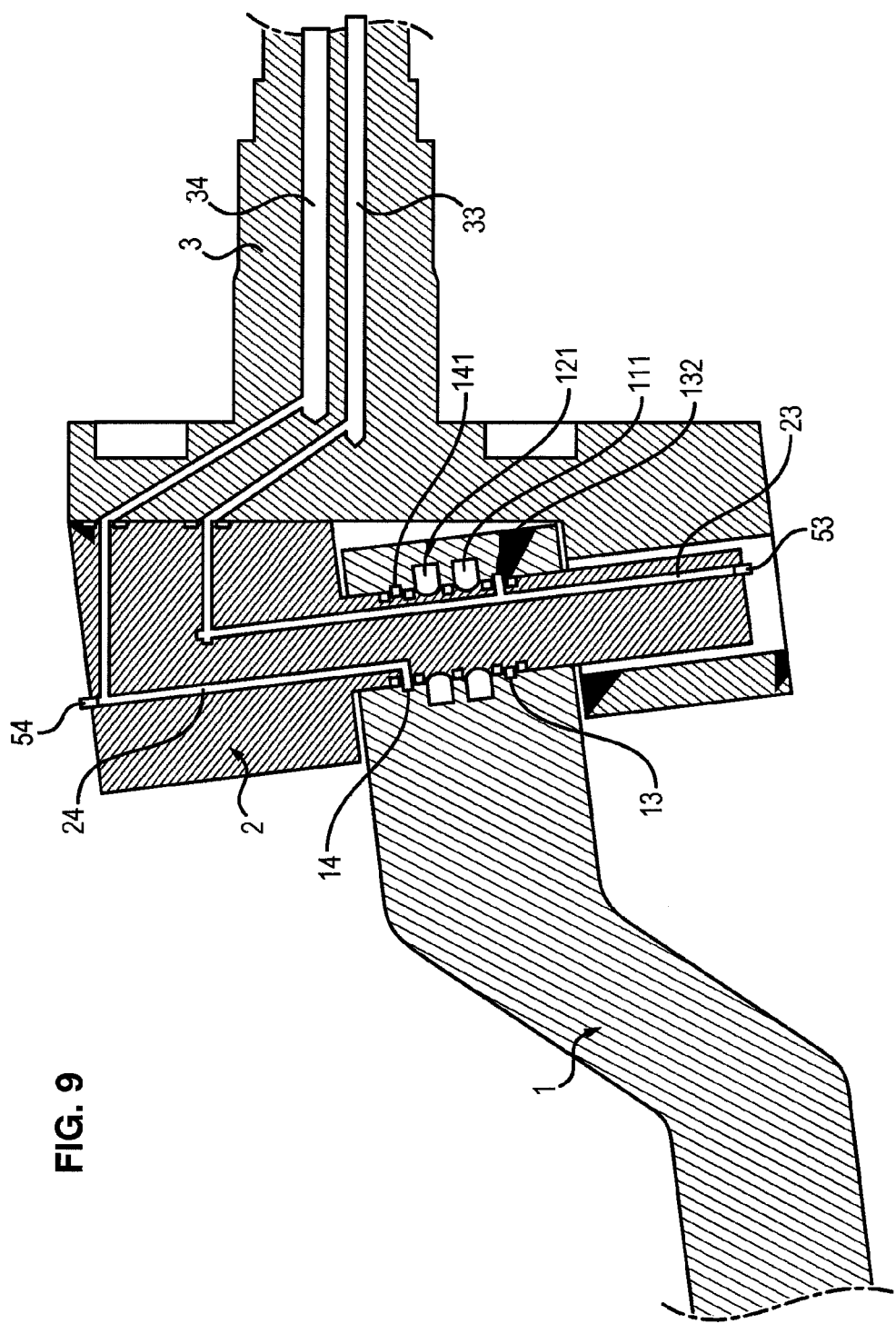
Figure 10:
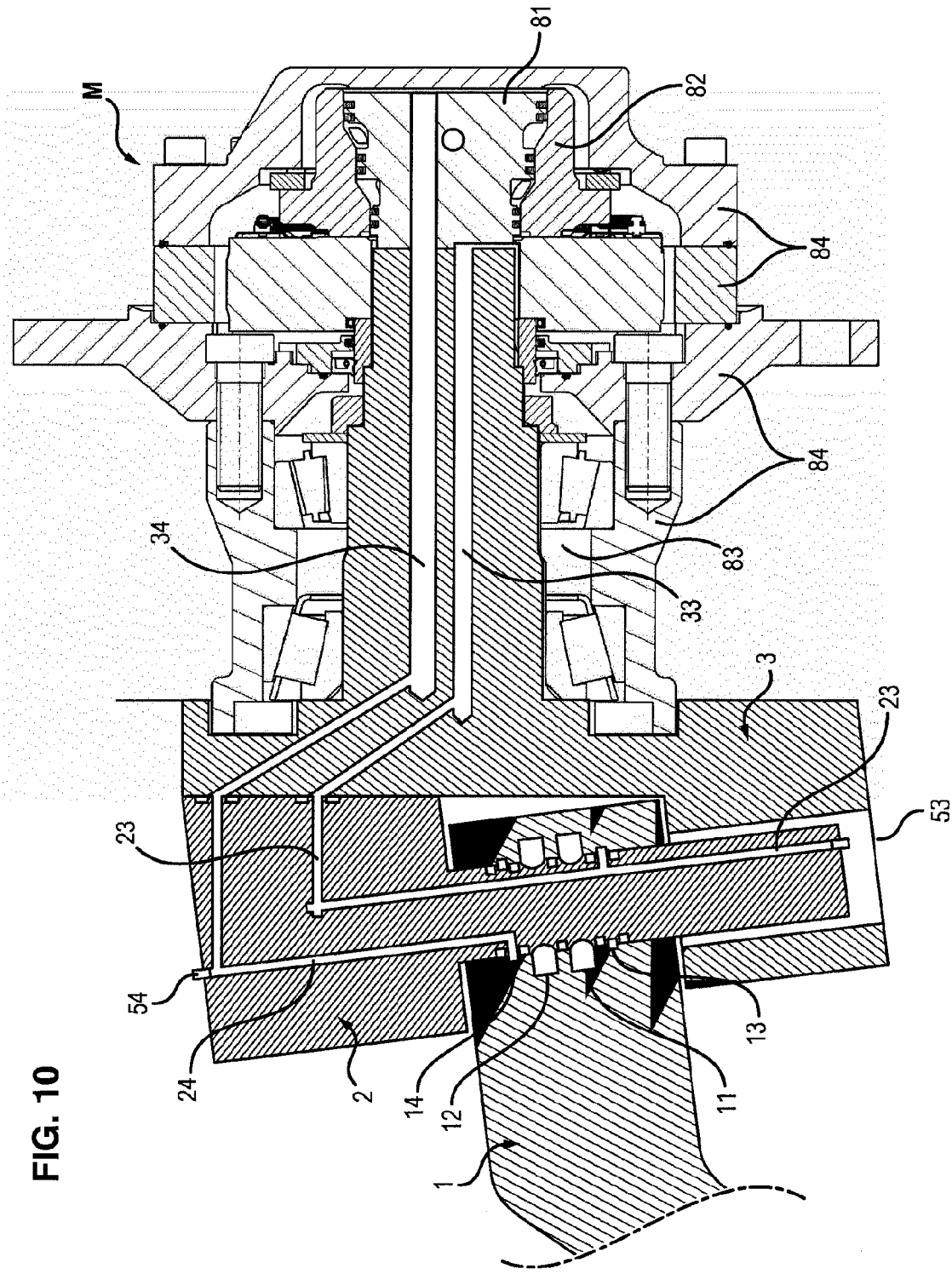

FIG. 5 shows a sectional view of another embodiment of an assembly according to one aspect of the invention, FIGS. 6 to 9 show several views of another embodiment of the assembly according to one aspect of the invention, FIG. 10 shows a view of an assembly according to one aspect of the invention, FIGS. 11 to 23 show several embodiments of sealing members which may be used for making the seal notably of the various pipes shown in the previous figures.

On the whole of the figures, identical or equivalent elements are marked with common numerical references.

DETAILED DESCRIPTION

Figure 1:
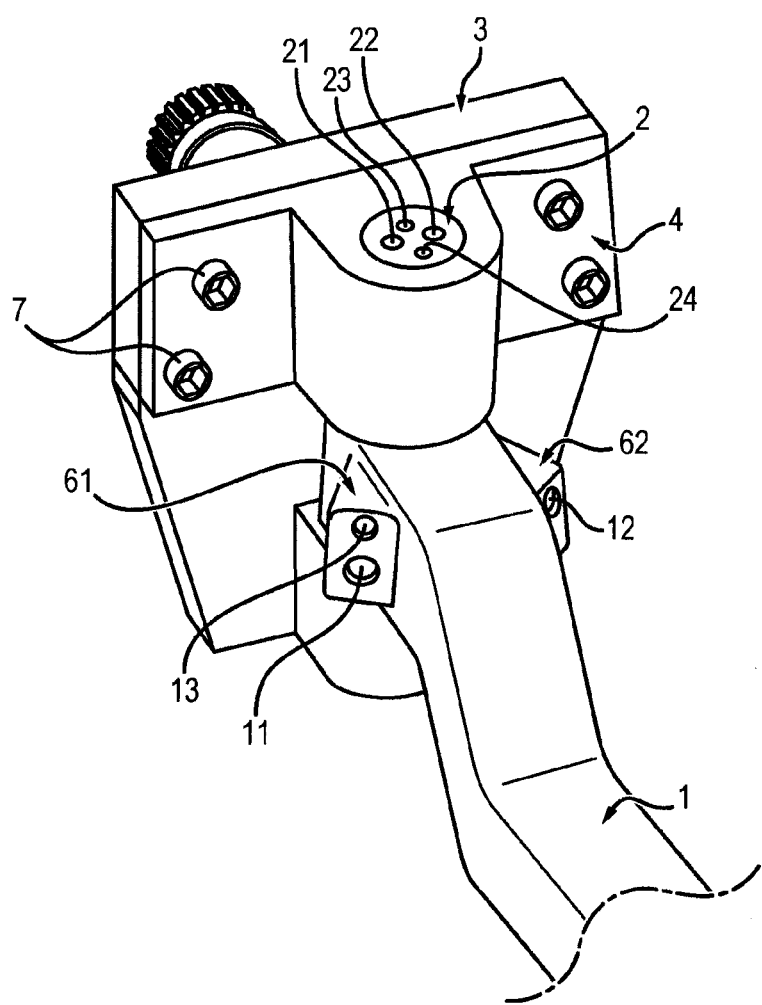
FIG. 1 shows a view of an assembly according to one aspect of the invention.

FIG. 1 shows a view of an assembly according to one aspect of the invention.

In this figure, a distinction is made between:
- an axle 1,
- a guiding pivot 2,
- a wheel spindle 3, mounted around said pivot 2, and suitable for receiving a wheel as well as a hydraulic motor which may produce the driving into rotation of said wheel around an axis defined by the spindle.

The assembly formed by the axle 1, the pivot 2 and the spindle 3 allows rotation of the spindle 3, and thus the rotation of a motor and of a wheel mounted on the spindle 3 relatively to the axle 1.

The pivot 2 is here formed with a shaft member defining a longitudinal axis of rotation, fixedly mounted in a cylindrical housing laid out at one end of the axle 1, on which the spindle 3 is rotatably mounted, thus being free in rotation around the longitudinal axis of said shaft member, and therefore more generally of the pivot 2.

In the illustrated embodiment, the spindle 3 is associated with a yoke 4, attached on the wheel spindle 3 and rotatably mounted around the pivot 2. The yoke 4 for example has a shape generally consisting of a cylindrical portion associated with a planar portion via which it is attached on the spindle 3 by means of a plurality of bolts 7; this planar portion of the yoke 4 being pressed against a planar portion of the spindle 3 thereby defining a substantial contact surface area between both of these parts in order to improve their support.

The yoke 4 typically comprises housings adapted for being associated with means for controlling the rotation of the spindle 3 around the axle 1.

More specifically, the spindle 3 and the yoke 4 each have a cylindrical housing, adapted so as to allow them to be fitted onto said shaft member of the pivot 2. These cylindrical housings are positioned on either side of the cylindrical housing made in the axle 1, which has the effect of ensuring the maintaining of the assembly formed by the spindle 3 and the yoke 4 on the assembly formed by the axle 1 and the pivot 2.

Several alternatives may be contemplated, depending on whether the pivot 2 is fixedly mounted vertically to the spindle 3 and the yoke 4, or relatively to the axle 1. Generally, the rotation of the pivot 2 relatively to the spindle 3 and to the yoke 4, or relatively to the axle 1 is achieved by means of bearings, for example roller bearings or bearing bushes ensuring the connection between the pivot 2 and the cylindrical housing(s) 4 of the axle 1, of the spindle and if necessary of the yoke 4 in which it is positioned.

In the case when the pivot is in a single portion, it then comprises at least two bearing areas, typically needle cages, ball abutments or plain bearings.

In the case when the pivot consists of several segments, each of these segments then comprises at least one bearing in order to connect them to the axle, to the yoke or to the spindle, and an additional bearing connecting them either to the axle, to the yoke or to the spindle, or to another segment forming the pivot. The lubrication of these areas forming a mechanical bearing may then be achieved either by oil, or by grease which gives the possibility of obtaining a superior lifetime. Mixed lubrications may be available for the bearing areas of a same pivot; for example, an oil-lubricated bearing area, and another bearing area of the same pivot lubricated with grease.

In the case when the bearing areas are lubricated with hydraulic oil, advantageously low pressure hydraulic oil, these bearing areas are surrounded with seal grooves provided with sealing members, typically sealing members as the ones described subsequently with reference to FIGS. 11 to 23.

By surrounded, is meant that the bearing area is either directly surrounded with two seal grooves provided with sealing members, or that an assembly formed with the bearing area and one or several other pipes is directly surrounded with two seal grooves provided with sealing members.

Lubrication with hydraulic oil may notably be used by taking the oil from a pipe for oil circulation, e.g. the pipe forming the discharge of the relevant hydraulic apparatus, it then being understood that the sealing member is adapted for supporting adequate pressures.

By mounting a hydraulic motor (not shown in the figures) on the spindle 3, fluid supply lines need to be delivered thereto, typically from a hydraulic pump or from accumulators.

More specifically, a hydraulic motor thereby positioned on the spindle 3 has to be connected to a high pressure line, a low pressure line, a case pressure line and if necessary a drain line, the drain line giving the possibility of recovering the leaks from the sealing system while the case pressure line gives the possibility of recovering leaks from the case of the motor in which pressure spikes may be observed.

The drain line is not necessary in the particular case of certain types of motors; typically releasable motors with return springs.

In order to allow such connections, the axle 1 is provided with internal pipes 11, 12, 13 and 14 opening here on protrusions 61 and 62 positioned on two opposite faces of the axle 1 and forming shapes protruding from the axle 1 defining supporting surfaces, adapted so as to be connected to high and low pressure lines and drains, which are connected to the admission and to the discharge outlet of the hydraulic motor. In the illustrated embodiment, two pipes open from each of the protrusions 61, 62, respectively the pipes 11, 13 on the protrusion 61, and the pipes 12 and 14 on the protrusion 62. Suitable attachment means are provided in order to allow attachment of supply lines to these pipes.

It is well understood that the terms of <<high pressure>> and <<low pressure>> are relative terms; the high pressure line HP is a line in which the pressure is higher than the pressure in the low pressure line LP.

Figure 2:
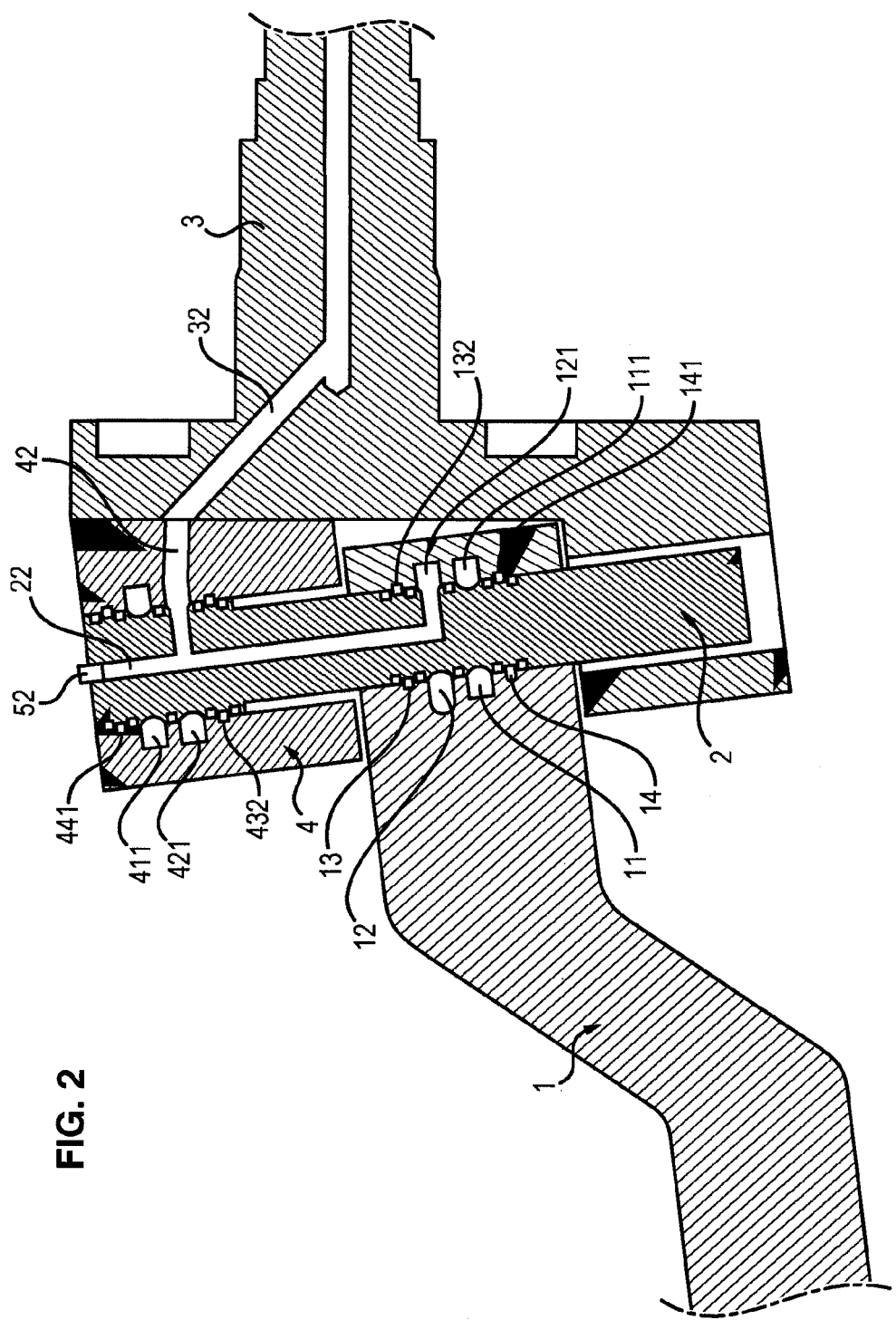
FIGS. 2, 3 and 4 show sectional views of the assembly shown in FIG. 1.
Figure 3:
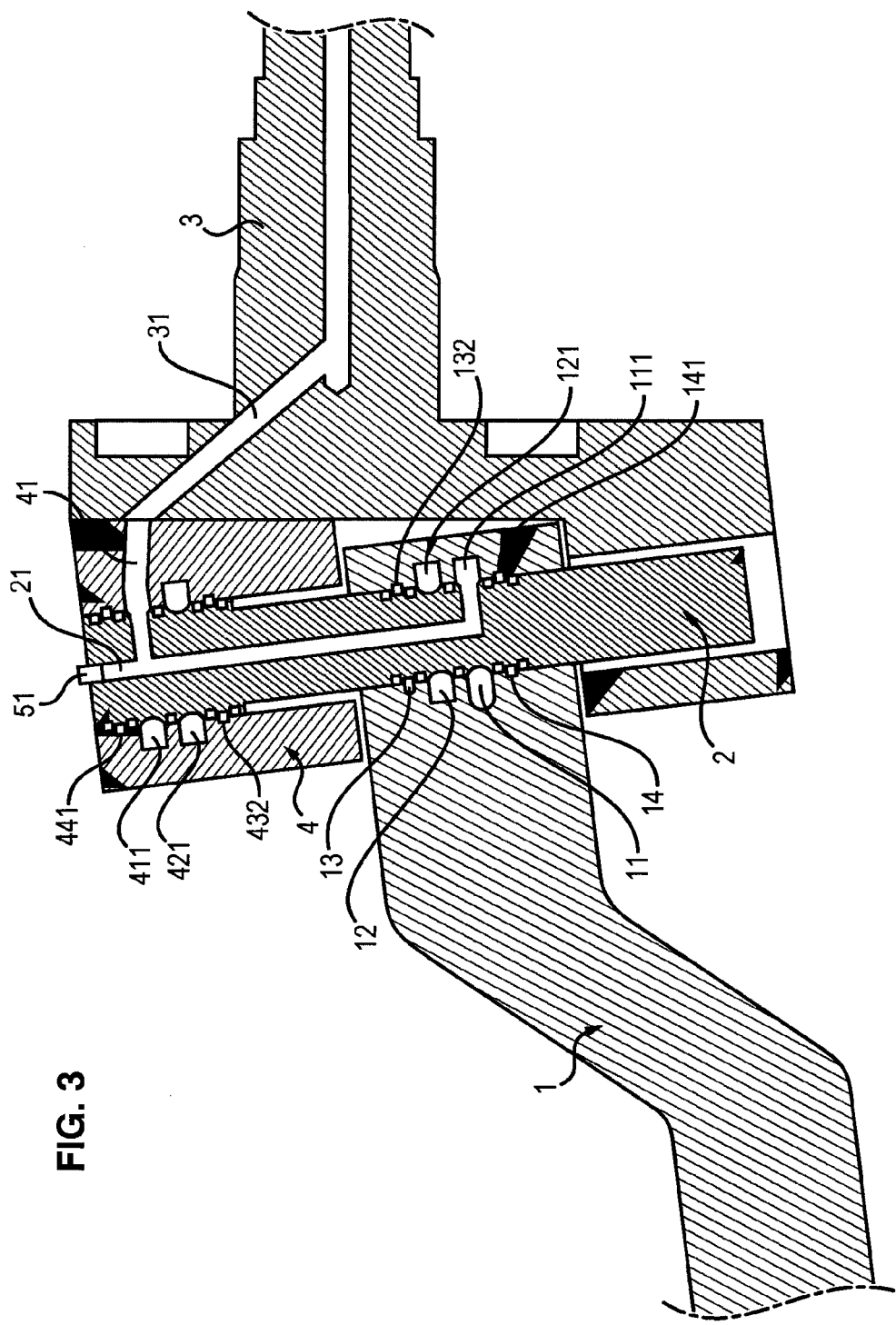
Figure 4:
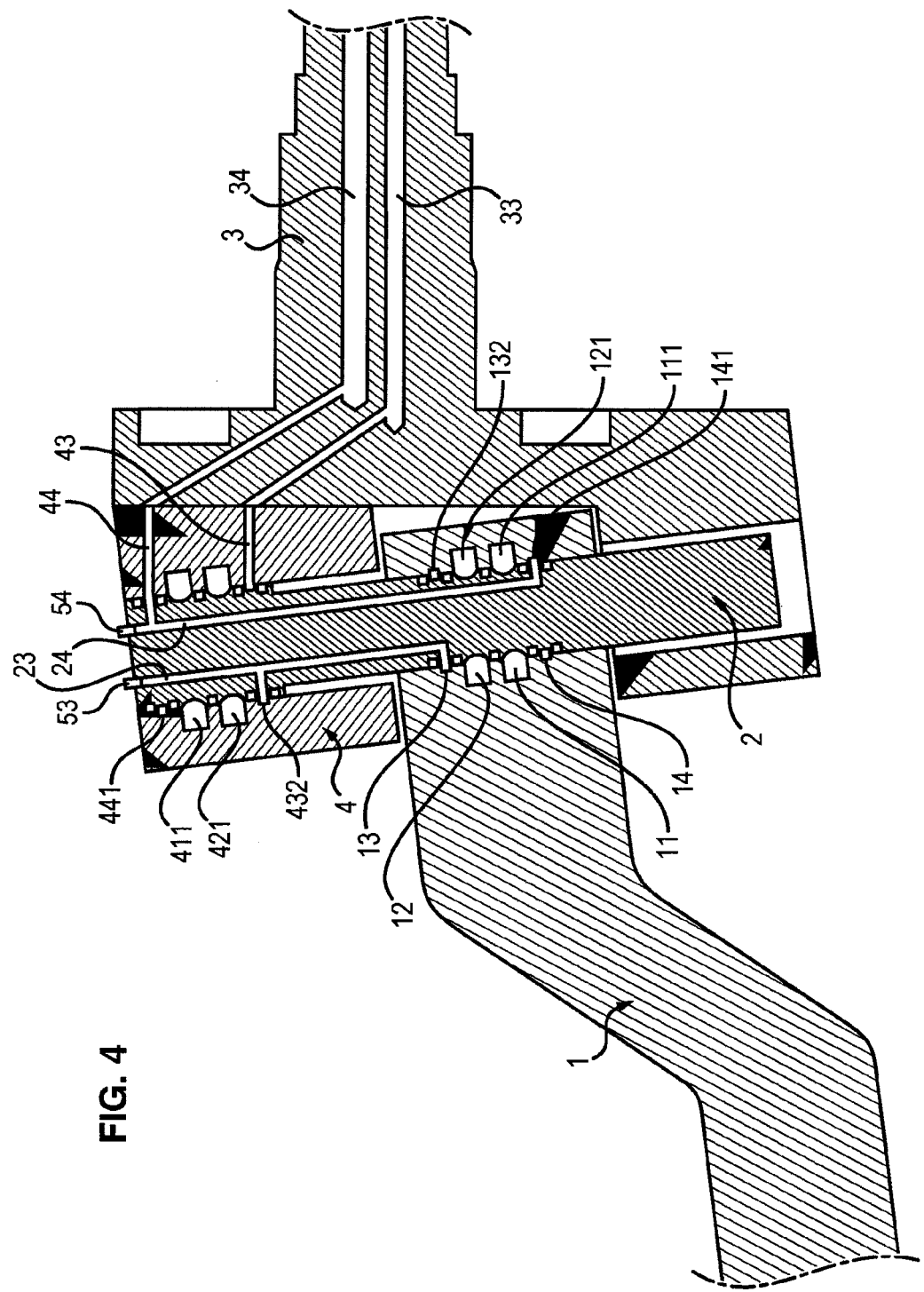

FIGS. 2, 3 and 4 show sectional views of the assembly illustrated in FIG. 1, according to two distinct planes, so as to view the different internal pipes made in the different parts which are described hereafter.

As shown by FIGS. 2 and 3, the internal pipes 11 and 12 extend in the body of the axle 1, and open into the cylindrical housing made at its end and receiving the pivot 2, so as to be in contact with the shaft member forming the pivot 2.

The shaft member forming the pivot 2 also comprises internal pipes 21, 22, opening at the periphery of said pivot 2 so as to be in fluidic connection with the internal pipes 11 and 12 of the axle 1, and extending along the axis of the pivot 2 before again opening at the periphery of said pivot 2, so as to be in contact with the yoke 4, or with the spindle 3 in the embodiments without a yoke which will be shown subsequently.

In the illustrated embodiment, the internal pipe 22 may be broken down into two radial sections respectively opening facing the axle 1 and the yoke 4, and a longitudinal section connecting said two radial sections, this longitudinal section opening here at one end of the shaft member of the pivot 2, and being obturated by a plug 52. A similar configuration is observed for the internal pipe 21, the longitudinal section of which opening from the end of the shaft member of the pivot 2, is obturated by a plug 51.

Other alternatives may be contemplated, and it is well understood that the shape of the internal pipes of the pivot 2 is not limited to the illustrated embodiment. Further it is noted that the pipes 21, 22 may be made by molding by means of a pivot 2 originating from a smelter; the pipes are then made with cores placed in the mold and removed after making of the part; thus it is possible to directly obtain pipes having the desired shape without requiring a plug at one of the ends of the pivot 2.

The yoke 4 is provided with through-pipes 41 and 42, opening:

into the cylindrical housing of the yoke 4 in which the shaft member forming the pivot 2 is positioned, so as to be in fluidic communication with the pipes 21 and 22 of the pivot 2, and onto the surface of the yoke 4 in contact with the spindle 3.

The spindle 3 is also provided with pipes 31, 32, opening onto the surface of the spindle 3 in contact with the yoke 4 so as to be in fluidic communication with respectively the pipes 41 and 42 of the yoke 4, and thus with the pipes 11 and 12 of the axle 2 and 21 and 22 of the pivot 2.

These pipes 31, 32 laid out in the spindle 3 on the other hand open for example at one end of the spindle adapted for receiving a hydraulic motor, so as to be connected to the admission and to the discharge outlet of such a hydraulic motor.

Thus, by connecting high and low pressure supply lines respectively to the pipes 11 and 12 of the axle 1, a hydraulic motor mounted on the spindle 3, may be exclusively supplied via pipes internal to the axle 1, to the pivot 2, to the spindle 3 and to the yoke 4, which avoids having to make connections with flexible hoses in proximity to a wheel and to a brake mounted on the spindle 3, and without requiring the addition of an additional rotating joint on the pivot 2.

In the illustrated embodiment, the axle 1 as well as the yoke 4 is provided with grooves made in the walls of their respective cylindrical housings intended for receiving the shaft member forming the pivot 2.

These grooves are connected to the respective pipes laid out in the axle 1 and in the yoke 4.

The grooves laid out in the cylindrical housing of the axle 1, respectively connected to the pipes 11 and 12 of the axle 1, are thus designated by 111 and 121 and the grooves laid out in the cylindrical housing of the yoke 4 respectively connected to the pipes 41 and 42 of the yoke 4, are designated by 411 and 421.

These grooves 111, 121, 411 and 421 are laid out so as to be at the height of the ends opening from the internal pipes 21, 22 of the pivot 2. They are circular, and extend over the whole periphery of the cylindrical housings of the axle 1 and of the yoke 4, so that the pipes 11, 12, 41 and 42 are in fluidic communication with the pipes 21 and 22 regardless of the angular position of the spindle 3 relatively to the axle 1. A rotating joint is thus made, the setting into place of which is considerably simplified in that it does not require any specific orientation of the different elements relatively to each other for ensuring the fluidic communication.

Alternatively, these grooves may be laid out on the external periphery of the shaft member of the pivot 2, so that they are at the height of the ends opening from the pipes laid out in the axle 1 so that the pipes laid out in the pivot 2 and in the axle 1 are in fluidic communication.

The sectional view illustrated in FIG. 2 illustrates an example of a configuration of the pipes 42 and 32 respectively laid out in the yoke 4 and in the spindle 3.

The pipe 42 laid out in the yoke extends radially from the cylindrical housing laid out in the yoke 4.

The pipe 32 laid out in the spindle 3 is broken down into two rectilinear portions; a first tilted portion opening onto the face of the spindle 3 in contact with the yoke 4, and which ensures the connection with the pipe 42 of the yoke 4, and a portion extending along the axis of rotation defined by the spindle 3, for a wheel mounted on said spindle 3.

FIG. 3 shows a similar configuration of the pipes 41 and 31 respectively laid out in the yoke 4 and in the spindle 3.

The assembly consisting of the axle 1, the pivot 2, the spindle 3 and the yoke 4 also comprises pipes forming the drain and a case pressure line for a hydraulic motor mounted on the spindle 3.

FIG. 4 shows a sectional view of the assembly shown in FIGS. 1 to 3, along a plane showing the structure of the different pipes forming the drain and the case pressure line.

The drain is here formed with a pipe 13 laid out in the axle 1, of a pipe 23 laid out in the axle 2, of a pipe 43 laid out in the yoke 4 and a pipe 33 laid out in the spindle 3.

The case pressure line is formed with a pipe 14 laid out in the axle 1, with a pipe 24 laid out in the pivot 2, with a pipe 44 laid out in the yoke 4 and a pipe 34 laid out in the spindle 3.

In the illustrated embodiment, the pipe 23 laid out in the pivot 2 consists of a longitudinal portion extending along the axis of the shaft element forming the pivot 2, and opening at one of its ends, and of a plurality of radial portions opening at the periphery of said shaft element, facing the axle 1 and the yoke 4. The pipe opening at one of the ends of the pivot 2 is typically obturated by means of a plug 53 when pipes 13 are laid out in the axle so as to connect the drain to supply lines as illustrated in FIG. 1. It is then possible, as in the case of the pipe 21 and 22 to contemplate making the pipes 23 and 24 by molding, by means of a pivot 2 from a foundry; the pipes are then made with cores placed in the mold and removed after making the part; pipes may thus be obtained having directly the desired shape without requiring a plug at one of the ends of the pivot 2, such molding techniques being well known.

It is also possible to contemplate alternatives in which the axle does not comprise such a pipe 13, and wherein the drain is connected to a supply line via its longitudinal portion opening at either end of the pivot 2.

The pipe 24 has a similar configuration, as this is seen in FIG. 4; its opening longitudinal portion is typically obturated by means of a plug 54.

Further, in the illustrated embodiment, the axle 1 and yoke 4 each comprise two leak grooves, 141, 132 and 441, 432 respectively.

The leak grooves 141 and 132 of the axle 1 are laid out in the axle 1, on either side of the grooves 111 and 121 described earlier, so as to surround both of these grooves 111 and 121. The leak groove 141 is laid out facing an opening portion of the pipe 24, while the leak groove 132 is laid out facing an opening portion of the pipe 23.

The leak grooves 441, 432 of the yoke 4 are laid out in the yoke 4, on either side of the grooves 411 and 431 described earlier, so as to surround both of these grooves 411 and 421. The leak groove 441 is laid out facing an opening portion of the pipe 24, while the leak groove 432 is laid out facing an opening portion of the pipe 23.

These leak grooves 141, 132, 441 and 432 give the possibility of collecting possible leaks from the grooves 111, 121, 411 or 421, and of draining the thereby collected fluid for example towards a tank at ambient pressure via the drain, or towards the case of a motor mounted on the spindle 3, and thus securing the seal towards the environment since the outer joints are not subject to significant pressures.

As earlier, alternatively, these grooves may be laid out on the external periphery of the shaft member of the pivot 2, so that they are at the height of the opening ends of the pipe laid out in the spindle 3 so that the pipes laid out in the pivot 2 and in the spindle 3 are in fluidic communication.

As indicated earlier, the yoke 4 comprises a pipe 43 opening into the cylindrical housing of the yoke 4 so as to be in fluidic connection with the pipe 23 laid out in the pivot 2 and also opening onto the surface of the yoke 4 in contact with the spindle 3.

In the illustrated embodiment, this pipe 43 is substantially radial relative to the axis of the cylindrical housing of the yoke 4.

The spindle 3 comprises a pipe 33 opening onto the surface of the spindle 3 in contact with the yoke 4 so as to be in fluidic communication with the pipe 43 of the yoke 4, and thus with the pipe 23 of the pivot 2. This pipe 33 laid out in the spindle 3 on the other hand opens for example at an end of the spindle 3 adapted for receiving a hydraulic motor, so as to be connected to the drain of such a hydraulic motor.

Similarly, the spindle comprises a pipe 34 opening onto the surface of the spindle 3 in contact with the yoke 4 so as to be in fluidic communication with the pipe 44 of the yoke 4, and thus with the pipe 24 of the pivot 2. This pipe 34 laid out in the spindle 3 on the other hand opens for example at one end of the spindle 3 adapted for receiving a hydraulic motor, so as to be connected to the case pressure line of such a hydraulic motor.

FIG. 5 illustrates a sectional view of an alternative of the assembly illustrated in the previous figures, in which the yoke 4 is part of the spindle 3.

The assembly therefore consists of the following elements: the axle 1, the pivot 2 and the spindle 3. The spindle 3 as illustrated comprises two cylindrical housings adapted for receiving the pivot 2 and the pipe 33 of the spindle directly opens into this cylindrical housing, so as to be in fluidic communication with the pipe 23 of the pivot, and thus form a drain line.

In this alternative, the pipe 31 of the spindle is formed with several substantially perpendicular pipes laid out in the spindle 3:
- a first pipe 36 extending from the internal surface of the cylindrical housing of the spindle 3, substantially parallel to the axis of rotation of the wheel defined by the spindle 3.
- a third pipe 38 extending along the spindle 3, along the axis of rotation which it defines, and
- a second pipe 37, substantially perpendicular to said first and second pipes, and allowing them to be connected with each other.

The first 36 and second 37 pipes typically open onto the face of the spindle 3 opposite to the pivot 2; they are therefore obturated by means of plugs, 56 and 57 respectively.

The other pipes typically have a configuration similar to the one shown in FIGS. 3 and 4, except for the pipes laid out in the spindle 3 which are typically formed in the same way as the pipe 31 shown in FIG. 5, i.e. three substantially perpendicular pipes.

Facing this configuration of pipes; it is noted that the alternative illustrated in FIGS. 1 to 4 in which the spindle is associated with a distinct yoke 4, gives the possibility of avoiding having bends with an angle of the order of 90° and thereby promoting circulation of the fluid.

The configuration of the pipes laid out in the axle 1, the pivot 2, the spindle 3 and if necessary in the yoke 4 as illustrated in the figures and described earlier, are described as examples; other embodiments may of course be contemplated.

Other alternatives are of course possible, notably in which the drain and/or the case pressure line extend as far as into the axle 1 in the same way as the pipes 11 and 12 described earlier.

FIGS. 6 to 9 show similar views to the views shown in FIGS. 1 to 4, of an alternative of an assembly according to the invention.

In this alternative, the pivot 2 is fixedly mounted on the spindle 3; the pivot 2 of this embodiment corresponds to the association of the pivot 2 and of the yoke 4 of the embodiment shown in FIGS. 1 to 4, which form here a single bolted part on the spindle 3.

The system thereby formed by the spindle 3 and the pivot 3 is then rotatably mounted relative to the axle 1 because of the cylindrical housing laid out in the axle and into which is inserted the tubular body of the pivot 2.

In the same way as for the embodiment illustrated in FIGS. 1 to 4, pipes are laid out in the axle 1, the pivot 2 and the spindle 3.

Insofar that the pivot 2 is fixedly mounted on the spindle 3, a single rotating joint is required at the interface between the pivot 2 and the axle 1.

Therefore, only the axle 1 comprises grooves 111 and 121 laid out in its cylindrical housing adapted for receiving the pivot 2, these grooves 111 and 121 being surrounded by leak grooves 132 and 141 which are respectively connected to the pipes 23 and 24 laid out in the pivot 2, adapted so as to respectively form the drain and the pressure line of the case of a hydraulic motor mounted on the spindle 3.

The invention thus allows a fluidic connection to be made in a wheel pivot which does not require the addition of additional and bulky parts such as a rotating joint coupled with the pivot, which occupy room at the upper or lower end of the pivot, and in which the hydraulic pipes required for operating a hydraulic motor mounted on the wheel spindle, i.e. two supply lines (high pressure and low pressure respectively), a drain and if necessary a case pressure line are laid out actually inside the different components, which avoids having connections to be made in proximity to the wheels and brakes, and having flexible hoses mounted on a rotating element.

Further, in the case when the wheel pivot lets through hydraulic oil, and has joints producing the seal of the different pipes, typically gaskets as described hereafter, the pivot then also achieves a rotating bearing function.

The lubrication of the areas forming a mechanical bearing may then be achieved either with oil, or with grease, with which a superior lifetime may be obtained.

FIG. 10 shows a sectional view similar to that of FIG. 9, further comprising a hydraulic motor M mounted on the spindle 3.

The motor M comprises a counter-mirror 81 positioned in the extension of the free end of the spindle 1, a mirror 82 around said counter-mirror 81, roller bearings 83 which achieve mounting of the rotating motor M on the spindle 3, and a case 84, here formed with several assembled parts.

This figure shows an exemplary configuration in which the drain line 33 is adapted for collecting hydraulic fluid from leaks at a dynamic seal member, while the case pressure line is extended via a pipe laid out in the counter-mirror 81, so as to be able to discharge the pressure from the case 84 of the motor M.

According to such an exemplary configuration, the pressure in the drain line is typically less than 3 bars in order not to damage the dynamic seal member, while the pressure in the case of the motor M may attain pressures of the order of 50 bars.

The motor M as shown, is connected to a high pressure line and a low pressure line which open out between the mirror 82 and the counter-mirror 81, via the pipes laid out in the assembly formed with the axle 1, the pivot 2 and the spindle 3, respectively:

the pipe 11 laid out in the spindle 1, the pipe 21 laid out in the pivot 2 and the pipe 31 laid out in the spindle 3;

the pipe 12 laid out in the axle 1, the pipe 22 laid out in the pivot 2 and the pipe 32 laid out in the spindle 3.

Depending on the operation of the motor, these pipes may respectively correspond to the high pressure line and to the low pressure line, or vice versa.

In the whole of the figures, <<high pressure>> lines are thus illustrated; typically supply and discharge lines of the motor M as illustrated in FIG. 10, in which the pressure may attain values of the order of 450 bars, and <<low pressure>> lines, typically drain lines and case pressure lines, in which the pressure is typically less than or equal to 30 bars.

In order to ensure the seal of these pipes, they are surrounded with seal gaskets which may have several shapes depending on the desired use.

On the assembly of FIGS. 11 to 20, a pipe 91 is schematically shown, laid out as a groove between two parts 92 and 93 rotatably mounted relatively to each other.

By analogy with these previous figures, the part 92 is for example the pivot 2 and the part 93 is typically the axle 1 or the wheel spindle 3. The pipe 91 is surrounded by two seal grooves 94 and 95, here laid out in the same part 92 as the one in which the groove forming the pipe 91 is laid out. It is well understood that the grooves forming the different pipes may be equally laid out in either of the parts 92 or 93.

In FIGS. 11 to 15 are first shown several alternatives of seal gaskets which may be used in order to surround and thereby ensure the seal of the high pressure lines, for example in order to surround the pipes 11, 12, 21, 22, 111, 121, 411 and 421 shown earlier. In these figures, the pipe 91 is typically a high pressure pipe as defined earlier.

The materials as well as the specific structures of these seal gaskets are adapted for giving them strength and ensuring their maintaining in position at high pressure values, typically ranging up to 450 bars.

It is well understood that the seal gaskets shown in these figures may also be used for producing the seal of the low pressure lines.

Figure 11:
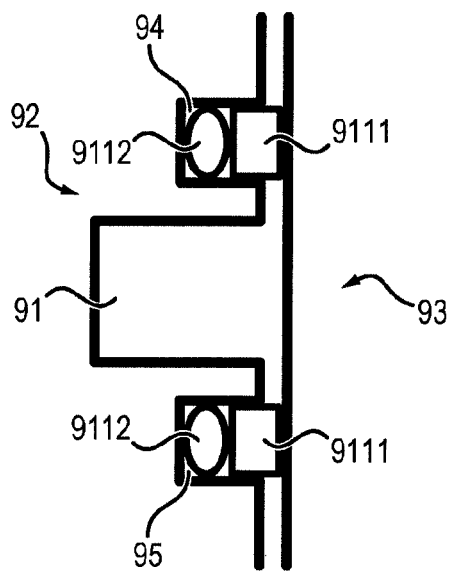

In the embodiment illustrated in FIG. 11, each of the leak grooves 94 and 95 comprise a sealing member 9 formed with a shoe 9111 mounted clamped against the part 93, surmounted with an O-ring seal 9112.

The shoe 9111 is typically made in a material having a low friction coefficient, typically in polytetrafluoroethylene (PTFE) or acetal.

The O-ring seal 9112 is typically made in an elastomeric material, for example in rubber.

Under the effect of the pressure within the pipe 91, the shoes 9111 and the O-ring seals 9112 bear against the walls of the seal grooves 94 and 95 opposite to the pipe 91, the shoes 9111 giving the possibility of making sure that the O-ring seals 9112 are not expelled via the functional play between the parts 92 and 93 under the effect of the pressure prevailing within the pipe 91.

Figure 12:
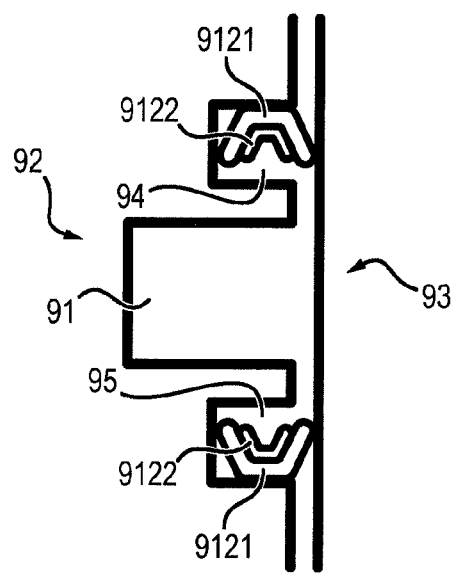

FIG. 12 shows another embodiment, in which the sealing member 9 consists of a gasket 9121 having a general V-shape, typically made in plastic, mounted so that both branches of the V are pre-stressed between the parts 92 and 93, and advantageously comprising a metal frame 9122 also having a V-shape, made in the form of an insert placed side by side at the internal surface of the V-gasket 9121.

This type of sealing member operates similarly to the sealing member of an actuator cylinder; under the effect of the pressure within the pipe 91, the sealing member is pressed against the walls of the seal grooves 94 and 95 opposite to the pipe 91, and the pressure on the internal face of the V will maintain its branches flattened against the walls of the part 92 and 93, thereby ensuring the seal.

Figure 13:
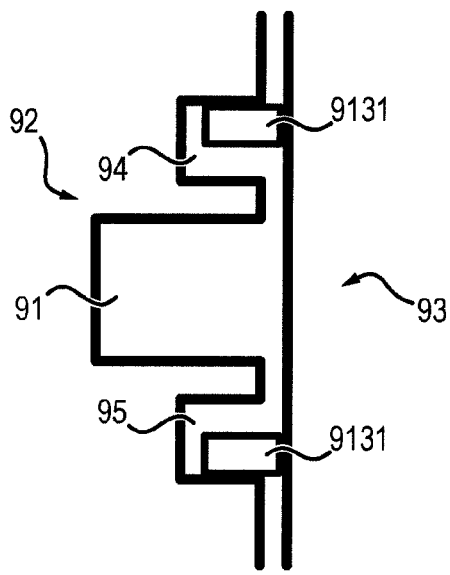

FIG. 13 further shows another embodiment, wherein the sealing member 9 consists of a segment 9131, typically made in cast iron or in plastic. This segment 9131 is mounted clamped against the part 93 or more generally against the part opposite to the one in which is laid out the groove in which it is positioned.

This segment operates in a similar way to the shoe shown in FIG. 11; under the effect of the pressure within the pipe 91, it is flattened against the walls of the seal grooves 94 and 95 opposite to the pipe 91, and thus obturates the functional play existing between the parts 92 and 93.

Figure 14:
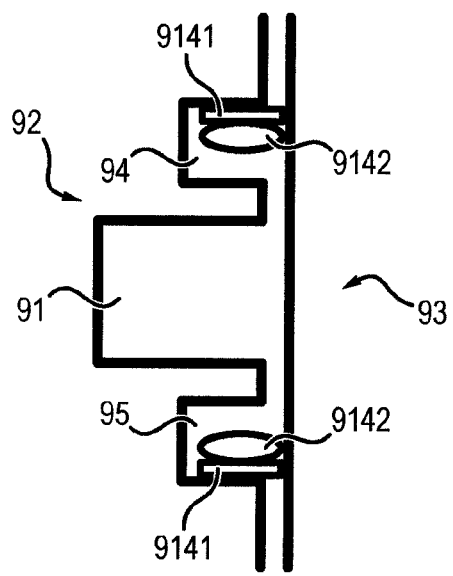

FIG. 14 further shows another embodiment, in which the sealing member 9 consists of an anti-extrusion ring 9141 and an O-ring 9142. The ring 9141 is typically made in a material similar to that of the shoe 9111 shown in FIG. 11 or to the segment 9131 shown in FIG. 13.

The anti-extrusion ring 9141 is mounted similarly to the segment 9131 shown in FIG. 13, so as to prevent the O-ring 9142 from being expelled via the functional play between the parts 92 and 93 under the effect of the pressure prevailing within the pipe 91.

Figure 15:
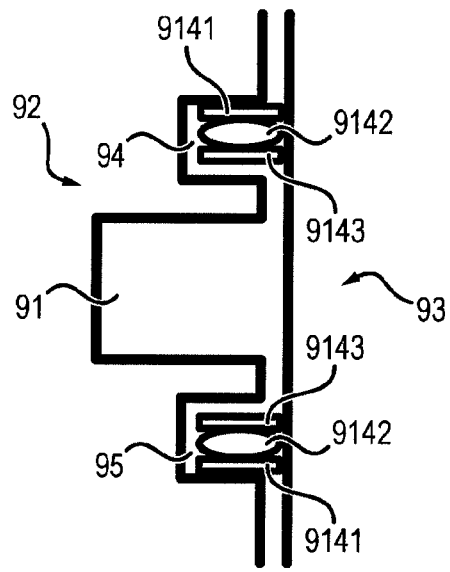

FIG. 15 shows an alternative of the embodiment shown in FIG. 14, in which the O-ring 9142 is surrounded with two anti-extrusion rings 9141 and 9143. The operation is similar to the one of the embodiment shown in FIG. 14, while ensuring resistance of the O-ring 9142 to extrusion in the case of a change in the direction of application of the pressure.

This specific alternative is advantageous for example for producing the seal between the pipes 11 and 12, 21 and 22, 111 and 121 or further 421 and 422 shown in the previous figures and typically forming the admission and the discharge outlet of a reversible hydraulic device, which therefore implies that the role and pressure ratio for example between the pipes 11 and 12 may change during use, the sealing member then being successively flattened against either one of the walls of the housing in which it is positioned.

Figure 16:
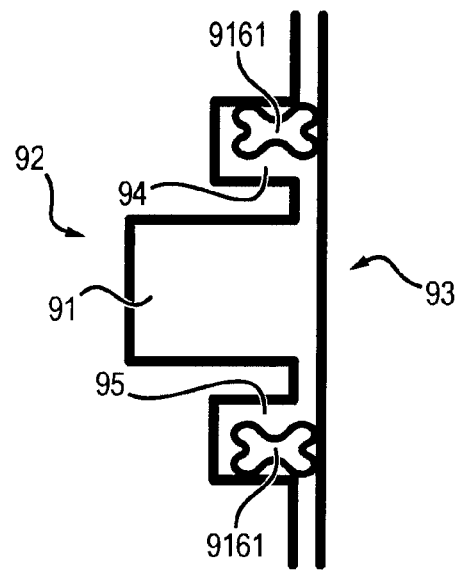

Several alternatives of seal gaskets are also shown in FIGS. 16 and 20, which may be used for surrounding and thereby ensuring the seal of low pressure lines, for example in order to surround the pipes 13, 14, 23, 24, 132, 141, 441 and 432 shown earlier.

These different seal gaskets may also be used in order to surround the bearing areas lubricated by means of low pressure hydraulic oil, thereby giving the possibility of having maintenance-free bearings.

In the embodiment illustrated in FIG. 16, each of the seal grooves 94, 95 comprise a sealing member 9 formed with a multilobed gasket 9161, in this case a circular gasket with four loads pressing against the part 93 so as to obturate the functional play between the parts 92 and 93.

This multilobed gasket 9161 is typically made in an elastomeric material, in rubber or nitrile.

Figure 17:
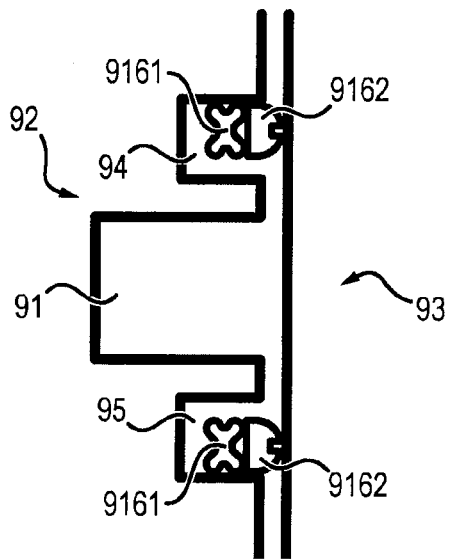

The embodiment illustrated in FIG. 17 is an alternative of the embodiment shown in FIG. 16, in which the multilobed gasket 9161 is coupled with a shoe 9162 pressing against the part. 93 opposite to the part 92 in which is laid out the housing 94 of the sealing member 9.

The shoe as shown comprises a substantially planar supporting face 9163 against which rests the multilobed gasket 9161, and a curved contact face 9164, bearing against the part 93, and having in its center a groove forming a reserve of grease.

Figure 18:
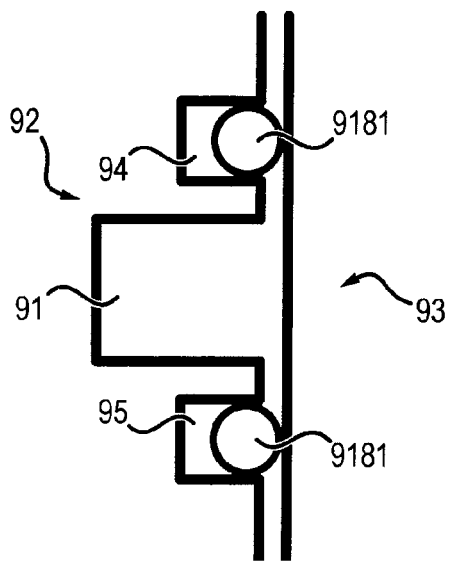

In the embodiment illustrated in FIG. 18, each of the seal grooves 94, 95 comprises a sealing member 9 formed with a conventional O-ring 9181.

In the embodiment illustrated in FIG. 19, each of the seal grooves 94 and 95 comprises a sealing member 9 formed with a circular gasket with a square section 9191.

In the embodiment shown in FIGS. 18 and 19, the O-ring 9181 or one with a square section 9191 is typically made in rubber, nitrile or in an elastomeric material.

In the embodiment illustrated in FIG. 20, each of the seal grooves 94, 95 comprises a sealing member 9 formed with a lip ring 9201 well known to one skilled in the art.

The lip ring 9201 consists of three distinct members:
a metal frame 9202, for example an L-shaped ring.
a body typically made in rubber, itself formed with a trim 9204 typically overmolded on the metal frame 9202, adapted so as to be in contact with the bottom of the housing 94 and 95 in which the lip ring 9201 is positioned, and a membrane 9205 adapted so as to be in contact with the part 93 opposite to the one in which said housing 94 and 95 is laid out. The body may also comprise an anti-dust lip 9206 or an optional scraping lip adapted so as to be also in contact with the part 93 opposite to the one in which the housing 94, 95 is laid out, and prevent particles (sand, dust, impurities, etc....) from penetrating into said housing 94, 95 via the functional play between the parts 92 and 93.
a clamping means 9207, typically a coil spring adapted for maintaining the lip ring 9201, and more specifically the membrane 9205 of the lip ring 9201 bearing against the part 93 opposite to the one in which the housing 94, 95 is laid out.

Figure 21:
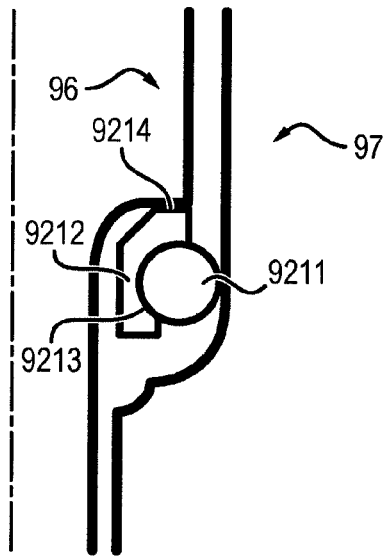
Figure 22:
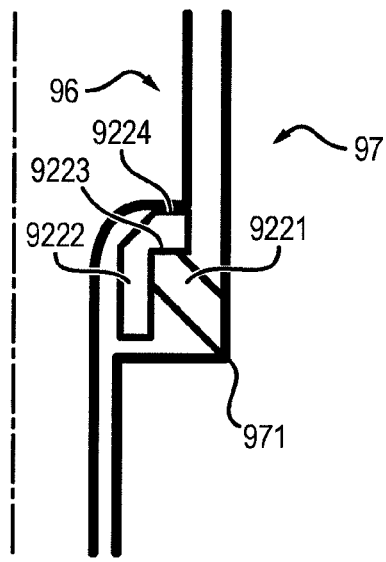

FIGS. 21 and 22 show two other alternatives of sealing members 9 which may be typically used in order to produce the seal between two members in a housing other than a groove specially laid out.

In the embodiments illustrated in FIGS. 21, 22, the sealing member is positioned between two parts 96 and 97 each having a discontinuity, thereby forming a housing in which the sealing member is positioned.

In the embodiment shown in FIG. 21, the sealing member is formed with an O-ring 9211 typically made in rubber, coupled with a metal ring 9212 having a general wedge shape, having a curved surface 9313 used as a support for the O-ring 9211, and a planar surface 9214 bearing against the part 96. The lip 9212 compresses the O-ring 9211 against the part 97, thereby producing the seal between both parts 96 and 97.

The planar surface 9214 is advantageously reduced, in order to improve the seal of the assembly by reducing the impact of surface irregularities.

The embodiment illustrated in FIG. 22 is an alternative to the one shown in FIG. 21; the sealing member is formed with a gasket 9221 typically made in rubber and having the general shape of a trapezium, coupled with a metal ring 9222 with a general wedge shape having a wedge-shaped supporting surface 9223. The gasket 9221 is thus compressed by the ring 9222 between the wedge 9223 of the ring 9222 and an angle 971, typically a right angle formed in the part 97. The ring 9222 also has a planar surface 9224 bearing against the part 96, said planar surface 9224 being advantageously reduced, in order to improve the seal of the assembly while reducing the impact of surface irregularities.

Figure 23:
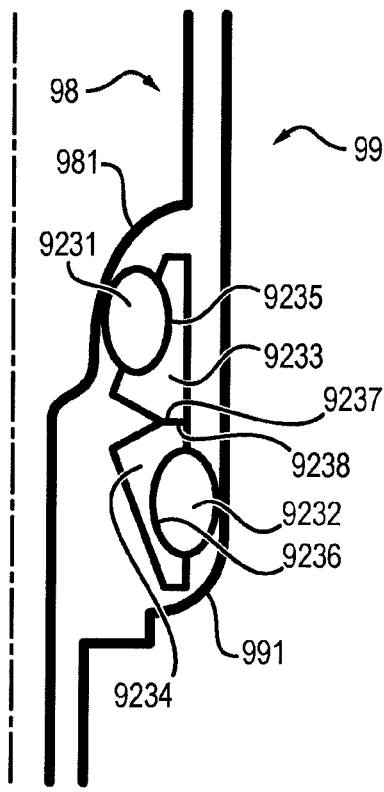

FIG. 23 shows an alternative of the embodiment shown in FIG. 21, comprising two ring-seal gasket pairs.

Two parts 98 and 99 are thus shown, each having a curved supporting surface 981 and 991 respectively.

The sealing member 9 comprises two gaskets 9231 and 9232, in this case O-rings typically made in rubber, coupled with rings 9233 and 9234 each having a curved surface, 9235 and 9236 respectively adapted in order to be used as a support for two O-rings 9231 and 9232 which are respectively compressed between the ring 9223 and the curved supporting surface 981 of the part 98 and the ring 9234 and the curved supporting surface 991 of the part 99.

Both of these rings 9233 and 9234 bear against each other along laid-out supporting surfaces, 9237 and 9238 respectively. These supporting surfaces are advantageously reduced, in order to improve the seal between these rings 9233 and 9234 by reducing the impact of surface irregularities. In the illustrated embodiment, this reduction of the contact surface areas is achieved via chamfers made in the rings 9233 and 9234.

The various described embodiments give the possibility of ensuring the seal of the different pipes shown, and this regardless of their conditions of use.

These different sealing members may further be used for producing the seal of the pipes of the system shown in patent application FR1162205 in the name of the applicant, not yet published, or more generally in any hydraulic machine.

Other alternatives of sealing members are well known to one skilled in the art; mention may notably be made of the following publications:

Catalog R joints toriques, O-rings, <<le joint francais>> Imprimerie Monnier Edition 06-94, Catalogue R joints toriques, O-rings—dimensions, <<le joint francais>> Imprimerie Monnier Edition 08-94, Catalogue<<JF4>> joints quadrilobes, X rings, <<le joint francais>> Imprimerie Monnier published on Jan. 4, 1993, Catalogues from Simret, notably<<joints hydrauliques et pneumatiques>> <<bagues Simmering® et joints pour mouvements tournants>>, Editor Carl Freudenberg

The invention claimed is:

1. An assembly, comprising,
an axle (1),
a steering pivot (2) mounted on the axle (1),
a wheel spindle (3) mounted on the pivot (2),
a hydraulic motor and a wheel mounted on said spindle (3), so that the spindle (3) is pivotally mounted relative to the axle (1), the axle (1), the spindle (3) and the pivot (2) being provided with communicating hydraulic internal pipes for supplying the hydraulic motor with fluid, the hydraulic internal pipes being laid out within the axle (1), the pivot (2) and the spindle (3) so that the pivot (2) produces a rotating joint ensuring a fluidic connection of said pipes laid out in the axle (1), the pivot (2) and the spindle (3) upon pivoting the spindle (3) relative to the axle (1),
wherein the pivot (2) comprises a shaft member fitted into the axle (1), and in which said hydraulic internal pipes are laid out, the spindle (3) being pivotally mounted relative to the shaft member, the spindle (3) comprising grooves extending around said shaft member and connected to the hydraulic internal pipes of the spindle (3) so as to thereby produce the rotating joint with the hydraulic internal pipes of the pivot (2).

2. The assembly according to claim 1, wherein the internal pipes laid out within the axle (1) correspond to a high pressure line and to a low pressure line connected to the hydraulic motor, forming the fluidic connection.

3. The assembly according to claim 2, wherein the spindle (3) further comprise two leak grooves positioned on either side of said grooves, said leak grooves being connected to at least one of a drain line opening into a reservoir at ambient pressure and to a case pressure line of the hydraulic motor, and being adapted for collecting leaks from the rotating joint.

4. The assembly according to claim 1, wherein said internal pipes are each surrounded by seal grooves provided with high pressure or low pressure sealing members.

5. The assembly according to claim 1, wherein the shaft member comprises peripheral grooves connected to the internal pipes laid out in the shaft member, so that the peripheral grooves are in fluidic communication with the pipes laid out in the axle (1) and in the spindle (3).

6. The assembly according to claim 5, wherein said pivot (2) is provided with at least two mechanical bearing areas connecting the pivot (2) to the spindle (3), each of said mechanical bearing areas being surrounded by sealing members comprising grooves laid out in said pivot (2) or in said spindle (3) in which seal gaskets are positioned.

7. The assembly according to claim 6, wherein at least one of said bearing areas is lubricated by means of a hydraulic oil, said bearing area being connected by means of a leak line to one of the hydraulic internal pipes laid out within the axle (1), the spindle (3) or the pivot (2) so as to ensure supply of hydraulic oil to said bearing area.

8. The assembly according to claim 1, wherein the said pipes laid out within the axle (1) open from said axle (1) onto surfaces comprising means for attaching flexible hoses in order to connect the flexible hoses to said pipes laid out in the axle (1).

9. The assembly according to claim 1, further comprising a yoke (4) attached on said wheel spindle (3) and rotatably mounted around said pivot (2), said yoke (4) comprising pipes adapted for allowing fluidic connections between the internal pipes laid out within the pivot (2) and within the spindle (3).

10. The assembly according to claim 9, wherein said pivot (2) is provided with at least two mechanical bearing areas connecting the pivot (2) to the yoke (4), each of said mechanical bearing areas being surrounded by sealing members comprising grooves laid out in said pivot or in said yoke (4) in which seal gaskets are positioned.

11. A vehicle comprising a steered wheel mounted on the assembly according to claim 1, as well as means for supplying the hydraulic motors with with the hydraulic fluid, the fluidic connection between said supply means and said hydraulic motors being achieved by means of the hydraulic internal pipes laid out within said axle (1), said pivot (2) and said spindle (3).

12. An assembly, comprising,
an axle (1),
a steering pivot (2) mounted on the axle (1),
a wheel spindle (3) mounted on the pivot (2),
a hydraulic motor and a wheel mounted on said spindle (3), so that the spindle (3) is pivotally mounted relative to the axle (1), the axle (1), the spindle (3) and the pivot (2) being provided with communicating hydraulic internal pipes for supplying the hydraulic motor with fluid, the hydraulic internal pipes being laid out within the axle (1), the pivot (2) and the spindle (3) so that the pivot (2) produces a rotating joint ensuring a fluidic connection of said pipes laid out within the axle (1), the pivot (2) and the spindle (3) upon pivoting the spindle (3) relative to the axle (1),
wherein the pivot (2) comprises a shaft member fitted into the axle (1), and within which said hydraulic internal pipes are laid out, the axle (1) being pivotally mounted relative to the shaft member, the axle (1) comprising grooves extending around said shaft member and connected to the hydraulic internal pipes of the axle (1) so as to thereby produce the rotating joint with the hydraulic pipes of the pivot (2), and
wherein the said hydraulic internal pipes laid out within the axle (1) open from said axle (1) onto supporting surfaces of protrusions (61, 62) provided for attaching flexible hoses in order to connect the flexible hoses to said pipes laid out in the axle (1), the supporting surfaces being oriented toward a direction opposite to the pivot (2).

13. The assembly according to claim 12, wherein the protrusions (61, 62) are positioned on two opposite faces of the axle (1).

14. The assembly according to claim 12, wherein the internal pipes laid out within the axle (1) correspond to a high pressure line and to a low pressure line connected to the hydraulic motor, the axle (1) thereby comprising two grooves for forming a fluidic connection between said internal pipes forming the high and low pressure lines of the axle (1), of the pivot (2) and of the spindle (3).

15. The assembly according to claim 13, wherein the axle (1) further comprise two leak grooves positioned on either side of said grooves, said leak grooves being connected to at least one of a drain line opening into a reservoir at ambient pressure and to a case pressure line of the hydraulic motor, and being adapted for collecting leaks from the rotating joint.

16. The assembly according to claim 12, wherein said internal pipes are each surrounded by seal grooves provided with high pressure or low pressure sealing members.

17. The assembly according to claim 16, wherein said pivot (2) is provided with at least two mechanical bearing areas connecting the pivot to the axle (1), each of said mechanical bearing areas being surrounded by additional sealing members comprising grooves laid out in said pivot (2) or in said axle (1) in which seal gaskets are positioned.

18. The assembly according to claim 12, wherein the shaft member comprises peripheral grooves connected to the internal pipes laid out in the shaft member, so that the grooves are in fluidic communication with the pipes laid out in the axle (1) and in the spindle (3).

19. The assembly according to claim 18, wherein at least one of said bearing areas is lubricated by means of a hydraulic oil, said bearing area being connected by means of a leak line to one of the hydraulic internal pipes laid out within the axle (1), the spindle (3) or the pivot (2) so as to ensure supply of hydraulic oil to said bearing area.

20. The assembly according to claim 12, wherein the pivot (2) is fixedly mounted on the spindle (3) so that a system formed by the pivot (2) and the spindle (3) is pivotally mounted relatively to the axle (1).

21. A vehicle comprising a steered wheel mounted on the assembly according to claim 12, as well as means for supplying the hydraulic motor with the hydraulic fluid, the fluidic connection between said supply means and said hydraulic motor being achieved by means of the hydraulic internal pipes laid out within said axle (1), said pivot (2) and said spindle (3).

* * * * *